United States Patent
Oyanagi et al.

(10) Patent No.: US 6,662,189 B2
(45) Date of Patent: Dec. 9, 2003

(54) METHOD OF PERFORMING DATA MINING TASKS FOR GENERATING DECISION TREE AND APPARATUS THEREFOR

(75) Inventors: Shigeru Oyanagi, Yokohama (JP); Hiroshi Sakai, Yokohama (JP); Kazuto Kubota, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 347 days.

(21) Appl. No.: 09/803,931

(22) Filed: Mar. 13, 2001

(65) Prior Publication Data

US 2001/0051934 A1 Dec. 13, 2001

(30) Foreign Application Priority Data

Mar. 31, 2000 (JP) .......................... 2000-098977

(51) Int. Cl.[7] .......................... G06F 17/30; G06F 17/00; G06T 11/20
(52) U.S. Cl. .......................... 707/102; 707/6; 707/101; 707/103 R; 707/104.1; 707/100; 345/440; 706/45; 706/20
(58) Field of Search .......................... 707/102, 6, 100, 707/101, 103 R, 104.1; 706/45, 20; 345/440

(56) References Cited

U.S. PATENT DOCUMENTS

| | | | | |
|---|---|---|---|---|
| 5,758,147 A | * | 5/1998 | Chen et al. ..................... | 707/6 |
| 5,787,274 A | * | 7/1998 | Agrawal et al. ............ | 707/102 |
| 5,799,311 A | * | 8/1998 | Agrawal et al. ............ | 707/102 |
| 6,055,539 A | * | 4/2000 | Singh et al. ................. | 707/102 |
| 6,182,058 B1 | * | 1/2001 | Kohavi ......................... | 706/45 |
| 6,278,464 B1 | * | 8/2001 | Kohavi et al. .............. | 345/440 |
| 6,442,561 B1 | * | 8/2002 | Gehrke et al. .............. | 707/102 |

FOREIGN PATENT DOCUMENTS

JP        07-262020        10/1995

OTHER PUBLICATIONS

Refinement of Fuzzy Decision Tree, Shigeaki Sakurai, Member, (TOSHIBA Corp.), IEE of Japan Technical Report C, vol. 117–3, No. 12, pp. 1833–1839, Nov. 20, 1997.

J.R. Quinlan, "Constructing Decision Trees", *Programs for Machine Learning*, Chap. 2, pp. 17–26 (1988).

S. Thomas et al., "An Efficient Algorithm for the Incremental Updation of Association Rules in Large Databases", *Computer and Information Science and Engineering Department*, University of Florida, pp. 263–266, (1997).

M. Ester, et al., "Incremental Clustering for Mining in a Data Warehousing Environment", *Institute for Computer Science, University of Munich*, pp. 323–333, (1998).

* cited by examiner

*Primary Examiner*—Frantz Coby
(74) *Attorney, Agent, or Firm*—Finnegan, Henderson, Farabow, Garrett & Dunner, L.L.P.

(57) ABSTRACT

A method of performing data mining tasks using a decision tree comprising, when insertion data is input, applying the insertion data to a decision tree created by a data set before the data is inserted in the decision tree, and dividing a leaf node corresponding to the insertion data from the decision tree in accordance with the value of insertion data.

18 Claims, 9 Drawing Sheets

| RECORD | AGE | CAR TYPE | RISK |
|--------|-----|----------|------|
| 1 | 23 | FAMILY | HIGH |
| 2 | 27 | SPORTS | HIGH |
| 3 | 43 | SPORTS | HIGH |
| 4 | 68 | FAMILY | LOW |
| 5 | 32 | TRUCK | LOW |
| 6 | 20 | FAMILY | HIGH |

INSERT DATA

| 7 | 30 | SPORTS | LOW |
| 8 | 45 | TRUCK | HIGH |

CHANGE DATA LIST

| NODE NUMBER | RECORD NUMBER | FLAG |
|-------------|---------------|------|
| n4 | 7 | INSERTED |
| n5 | 8 | INSERTED |

| NODE NUMBER | CONDITION FORMULA |
|---|---|
| n1 | AGE < 29.5 |
| n3 | CAR TYPE = SPORTS |
| | |

| NODE NUMBER | LEFT CHILD NODE | RIGHT CHILD NODE |
|---|---|---|
| n1 | n2 | n3 |
| n2 | . | . |
| n3 | n4 | n5 |
| n4 | . | . |
| n5 | . | . |

| RECORD | ATTRIBUTE | | CLASS |
|---|---|---|---|
| | AGE | CAR TYPE | RISK |
| 1 | 23 | FAMILY | HIGH |
| 2 | 27 | SPORTS | HIGH |
| 3 | 43 | SPORTS | HIGH |
| 4 | 68 | FAMILY | LOW |
| 5 | 32 | TRUCK | LOW |
| 6 | 20 | FAMILY | HIGH |
| 7 | 30 | SPORTS | LOW |
| 8 | 45 | TRUCK | HIGH |

DELETE DATA : 3, 6

MODIFY DATA LIST

| NODE NUMBER | RECORD NUMBER | FLAG |
|---|---|---|
| n6 | 3 | DELETED |
| n2 | 6 | DELETED |

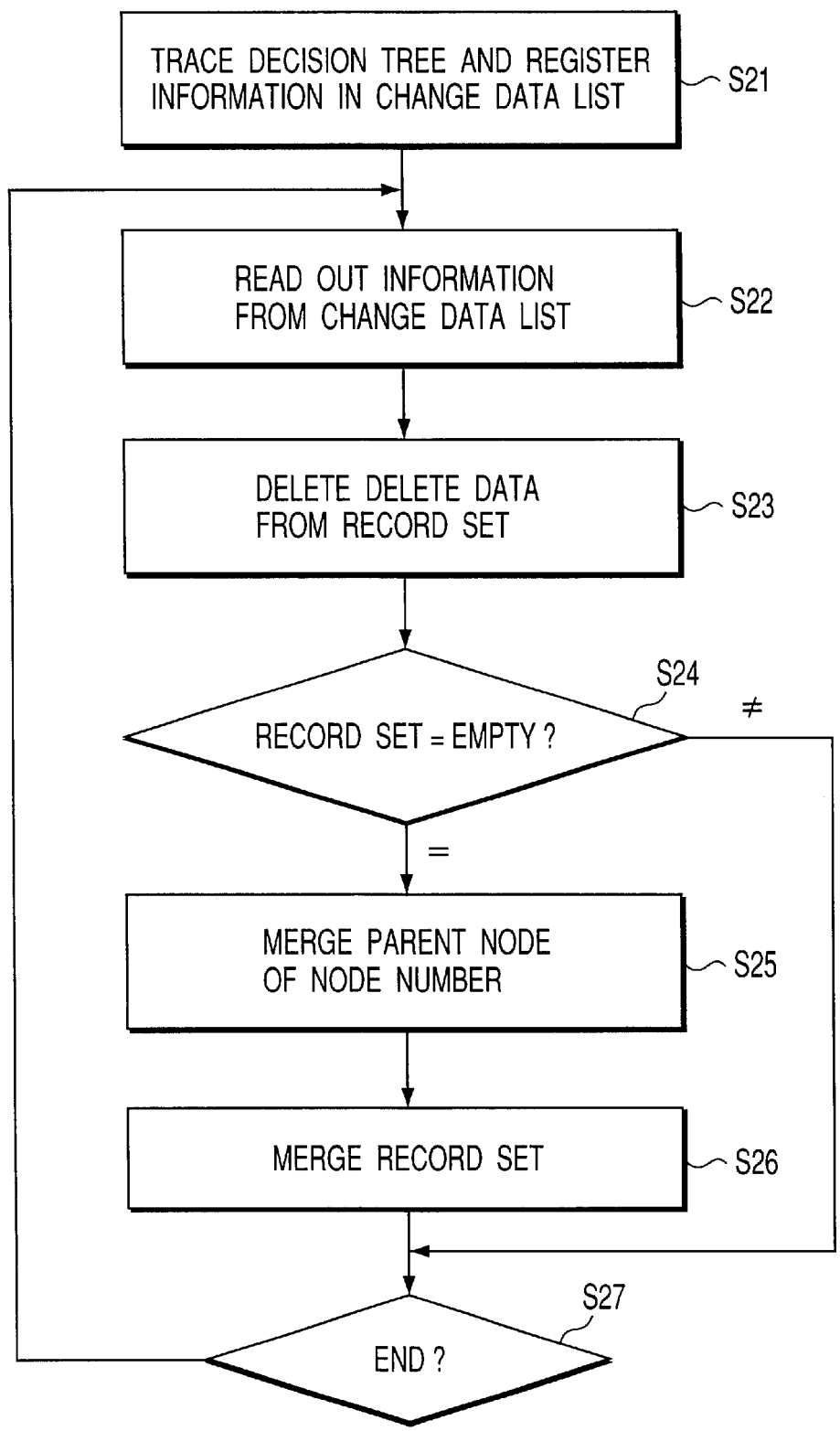
F I G. 8

| RECORD | AGE | CAR TYPE | RISK |
|---|---|---|---|
| 1 | 23 | FAMILY | HIGH |
| 2 | 27 | SPORTS | HIGH |
| ~~3~~ | ~~43~~ | ~~SPORTS~~ | ~~HIGH~~ |
| 4 | 68 | FAMILY | LOW |
| 5 | 32 | TRUCK | LOW |
| ~~6~~ | ~~20~~ | ~~FAMILY~~ | ~~HIGH~~ |
| 7 | 30 | SPORTS | LOW |
| 8 | 45 | TRUCK | HIGH |

(columns grouped as ATTRIBUTE: AGE, CAR TYPE; CLASS: RISK)

DELETE DATA : 3, 6

MODIFY DATA LIST

| NODE NUMBER | RECORD NUMBER | FLAG |
|---|---|---|
| n6 | 3 | DELETED |
| n2 | 6 | DELETED |

| RECORD | AGE | CAR TYPE | RISK |
|---|---|---|---|
| 1 | 21 | FAMILY | HIGH |
| 2 | 24 | FAMILY | HIGH |
| 3 | 26 | TRUCK | HIGH |
| 4 | 27 | SPORTS | HIGH |
| 5 | 28 | SPORTS | HIGH |
| 6 | 30 | FAMILY | LOW |
| 7 | 32 | SPORTS | HIGH |
| 8 | 35 | FAMILY | LOW |
| 9 | 38 | TRUCK | HIGH |
| 10 | 48 | FAMILY | LOW |
| 11 | 52 | SPORTS | LOW |
| 12 | 55 | TRUCK | LOW |
| 13 | 68 | SPORTS | LOW |

FIG. 11A

| RECORD | AGE | CAR TYPE | RISK |
|---|---|---|---|
| | | ATTRIBUTE | CLASS |
| 1 | 21 | FAMILY | HIGH |
| 2 | 24 | FAMILY | HIGH |
| 3 | 26 | TRUCK | HIGH |
| 4 | 27 | SPORTS | HIGH |
| 5 | 28 | SPORTS | HIGH |
| 6 | 30 | FAMILY | LOW |
| 7 | 32 | SPORTS | HIGH |
| 8 | 35 | FAMILY | LOW |
| 9 | 38 | TRUCK | HIGH |
| 10 | 48 | FAMILY | LOW |
| 11 | 52 | SPORTS | LOW |
| 12 | 55 | TRUCK | LOW |
| 13 | 68 | SPORTS | LOW |

FIG. 11B

INSERT DATA

| 14 | 50 | TRUCK | HIGH |
|---|---|---|---|
| 15 | 53 | TRUCK | HIGH |
| 16 | 57 | TRUCK | HIGH |

METHOD OF PERFORMING DATA MINING TASKS FOR GENERATING DECISION TREE AND APPARATUS THEREFOR

CROSS-REFERENCE TO RELATED APPLICATIONS

This application is based upon and claims the benefit of priority from the prior Japanese Patent Application No. 2000-098977, filed Mar. 31, 2000, the entire contents of which are incorporated herein by reference.

BACKGROUND OF THE INVENTION

The present invention relates to a method of performing data mining tasks for generating a decision tree from a large sale database and an apparatus therefor.

Data mining has received a great deal of attention as a technique for extracting knowledge from a large scale database. There have been proposed a variety of data mining techniques such as a decision tree, neural network, association rule finding, and clustering. Applications of these techniques for extracting features hidden in the database to a variety of fields such as marketing are expected.

A database as a mining target is not generally a database operating in a mission critical system but uses data constructed as another database (data warehouse) by periodic snapshots. Database updating is not reflected in real time. In practice, data are inserted to the database at once every predetermined period of time. For this reason, to grasp the tendency in the database as a whole, data mining must be performed for the entire database every time data are periodically inserted. A database subjected to data mining often has a large number of data. It takes much time to perform data mining for the entire database every time data are inserted to it.

A decision tree is a typical example of data mining techniques. A tree is created to have as a node a condition for classifying records in a database. A new record is applied from the root of the tree to classify the record. For example, the decision tree is used for an application in which direct mail destinations are limited to only appropriate customers by using the purchase histories and attributes of the customers in retail business.

In the decision tree, a tree structure is created on the basis of data in a table format (called a training set). A plurality of attributes and one class are assigned to the data in the table format. Each attribute is used for classifying each record into one of the class. Each attribute may take a category value (categorical value) or continuous value.

According to the method of creating a decision tree, nodes are so generated as to optimally divide a training set from the root of the tree, and the training set is divided in accordance with this division. Nodes are then repeatedly generated to further optimally divide the divided training sets.

In generating the decision tree as described above, the entire training set must be accessed in order to select an optimal division. Access to the database is required every time a division is repeated. Therefore, it takes much time to generate a decision tree from a large scale database.

The conventional decision tree technique requires recreating a decision tree every time data is inserted into the database or deleted.

BRIEF SUMMARY OF THE INVENTION

It is an object of the present invention to provide a method of performing data mining tasks for efficiently generating a decision tree which reflects the latest contents of the database by applying a decision tree already created to only an inserted or deleted portion, and an apparatus for performing data mining tasks.

It is another object of the present invention to provide a method of performing data mining tasks to divide a leaf node corresponding to insertion data from a decision tree created by a data set into which the insertion data are not inserted.

It is still another object of the present invention to provide a method of, when deletion data is input, performing data mining tasks such that a given node connected to a leaf node, corresponding to the deletion data, of a decision tree created by a data set from which the deletion data is not deleted is merged with other leaf node connected to the given node.

It is still another object of the present invention to provide a method of performing data mining tasks, in which when insertion or deletion data is input, an evaluation value by the division about a passing node is recalculated for a decision tree into which the insertion data is inserted or from which the deletion data is not deleted, and when the recalculated division evaluation value satisfies a specific condition, a partial tree below the passing node is reconstructed.

According to the present invention, there is provided a data mining apparatus using a decision tree, comprising an application section which, when the insertion data is input, applies the insertion data to a decision tree created by a data set into which the insertion data is inserted, to generate an application result; and a modification section which divides a leaf node corresponding to the insertion data in accordance with the application result to modify the decision tree.

According to the present invention, there is also provided a data mining apparatus using a decision tree, comprising an application section which, when deletion data is input, applies the deletion data to a decision tree created by a data set from which the deletion data is not deleted, and generates an application result; and a modification section which merges a given node connected to a leaf node of the decision tree created by the data set, the leaf node corresponding to the deletion data, to other node connected to the given node to modify the decision tree.

According to the present invention, there is also provided a data mining apparatus using a decision tree, comprising an application section which, when insertion data or deletion data is input, applies the insertion or deletion data to a decision tree created by a data set into or from which the data is not inserted or deleted, recalculates an evaluation value by division about a passing node through which the data passes, and generates the recalculated evaluation value; and a modification section which reconstructs a partial tree below the passing node when the evaluation value satisfies a specific condition.

According to the present invention, since the entire large scale database need not be accessed again, the data mining operation performed every time data is inserted or deleted can be performed at higher speed.

BRIEF DESCRIPTION OF THE SEVERAL VIEWS OF THE DRAWING

FIG. 8 is a flow chart showing decision tree data mining in the data deletion mode;

FIGS. 11A to 11C are views for explaining decision tree incremental data mining in a data insertion mode according to the third embodiment.

DETAILED DESCRIPTION OF THE INVENTION

Figures 1, 2A, 2B, 2C:
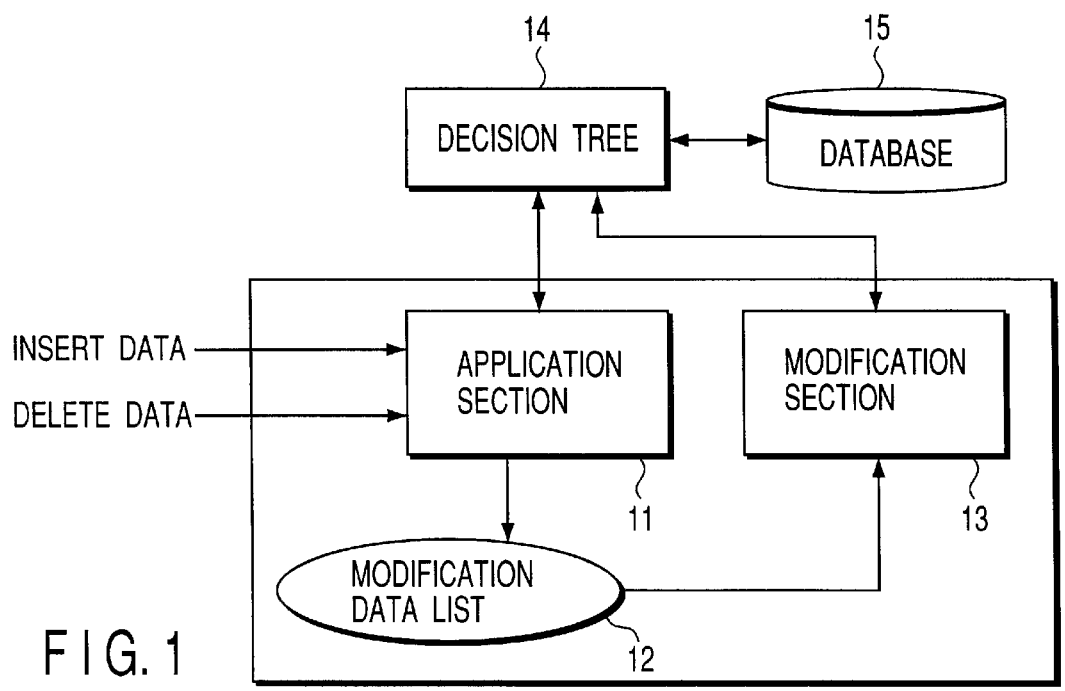
FIG. 1 is a block diagram showing an incremental decision tree generation system according to an embodiment of the present invention.
FIGS. 2A to 2D are views for explaining decision tree incremental data mining in a data insertion mode as the first embodiment of the present invention.

The arrangement of an incremental decision tree generation system used to practice an incremental data mining method according to an embodiment of the present invention will be explained with reference to FIG. 1. Assume that a decision tree about a given database is already created, and that a class value and a link to a record set of a corresponding database are already stored in each leaf node of the decision tree.

The decision tree generation system according to the present invention comprises an application section 11 which receives insertion or deletion data, a modification data list 12, and a modification section 13. The application section 11 and modification section 13 are connected to a decision tree section 14. The decision tree section 14 is connected to a database 15.

The application section 11 has the following functions. That is, when data is inserted to the database 15, the application section 11 applies the insertion data from the root node of the decision tree to find a corresponding leaf node and stores in the modification data list 12 a number identifying the node, insertion data, and a flag representing insertion. When data is deleted from the database 15, the application section 11 applies the deletion data from the root node of the decision tree to find a corresponding leaf node and stores in the modification data list 12 an identification number that identifies the node, deletion data, and a flag representing deletion.

The modification section 13 has functions of changing a corresponding decision tree of the decision tree section 14 with reference to the modification data list 12 and at the same time corrects the database 15.

Note that the modification section 13 may be directly activated for each insertion or deletion data without storing the insertion or deletion data in the modification data list to modify the decision tree, but that the decision tree is generally collectively performed for a higher efficiency.

Even the decision tree modified as described above can be subjected to pruning as in the conventional method.
(First Embodiment)

An incremental data mining method using the above decision tree generation system according to the first embodiment will be described below.

Figure 2D:
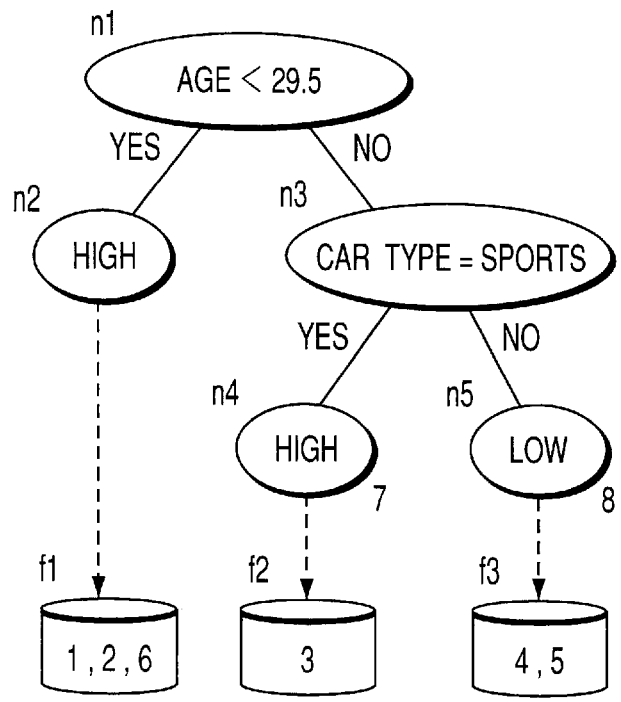
Figure 3:
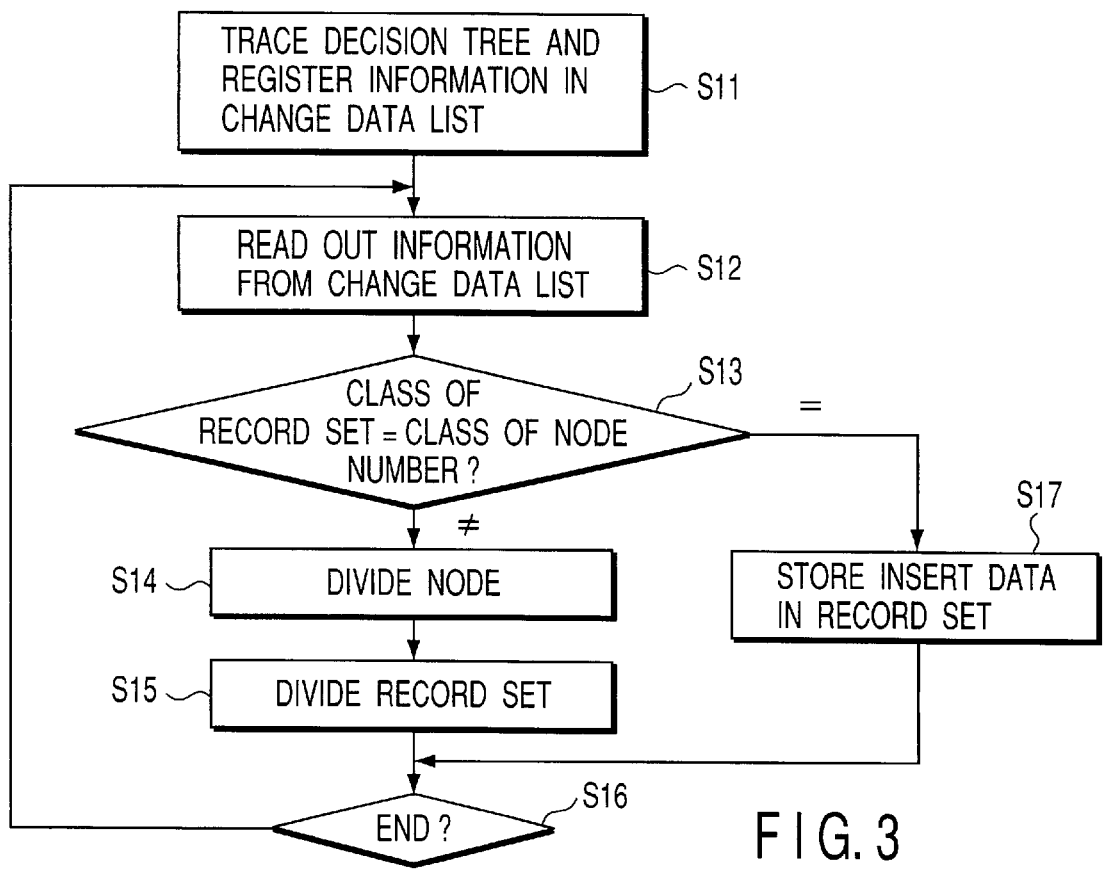
FIG. 3 is a flow chart showing decision tree incremental mining in the data insertion mode.

Operation of inserting data to a tree already created will be described with reference to tables in FIGS. 2A to 2C, a tree in FIG. 2D, and a flow chart in FIG. 3.

When insertion data is generated, the data is stored in a record set, as shown in FIG. 2B. In this case, as shown in FIG. 2D, information (f1, f2, f3) representing a file which stores a corresponding record set is applied to the leaf node of the decision tree.

As shown in FIG. 2B, when records 7 and 8 are inserted, these insertion data are input to the application section 11 shown in FIG. 1. The application section 11 applies insertion data to a decision tree to find the corresponding node numbers. The application section 11 tests a node of Age<29.5 for record 7 and selects the right branch. By this selection, a node of Car Type=sports is tested, and the left branch is selected to reach node n4. Since node n4 is a leaf node, the query is immediately ended. The application section 11 registers node number=n4, record number=7, and flag=insertion in the modification data list 12.

The application section 11 tests a node of Age<29.5 for record 8 to select the right branch. By this selection, a node of Car Type=sports is tested, and the right branch is selected to reach node n5. Since node n5 is a leaf node, the query is immediately ended. The application section 11 registers node number=n5, record number=8, and flag=insertion in the modification data list 12 (S11).

When all the insertion data are completely registered in the modification data list 12, the modification section 13 is activated. The modification section 13 modifies the corresponding decision tree with reference to the modification data list 12. More specifically, the modification section 13 reads out node number=n4, record number=7 and flag=insertion (S12), sets "high" as the class of node number n4, and queries record set f2 of the corresponding database (S13). The class of the data of record number 7 is "low", which is different from the class value of node n4. In this case, node n4 must be divided. Node division is similar to decision tree generation processing. A node is so generated as to optimally divide the sum obtained by adding the insertion data to the record set corresponding to the node (S14). In this case, Age<36.5 is generated, data 3 belonging to record set f2 and insertion data 7 are divided in accordance with the generated node and stored in f4 and f5, respectively (S15).

Whether processing is ended is determined (S16), and the flow returns to step S12. In step S12, node number=n5, record number=8, and flag=insertion are read out from the modification data list 12. In step S13, "low" is set as the class of node number n5, and record set f3 of the corresponding data base is queried. Since the class of the data of record number 8 is "low", this class value matches that of n5. In this case, node n4 need not be divided. Insert data 8 is stored in record set f3 of the corresponding database (S17). The decision tree obtained by the above insertion processing is shown in FIG. 4.

A processing of searching a leaf node belonging to the insertion record will be described as follows.

Figures 4, 5, 6:
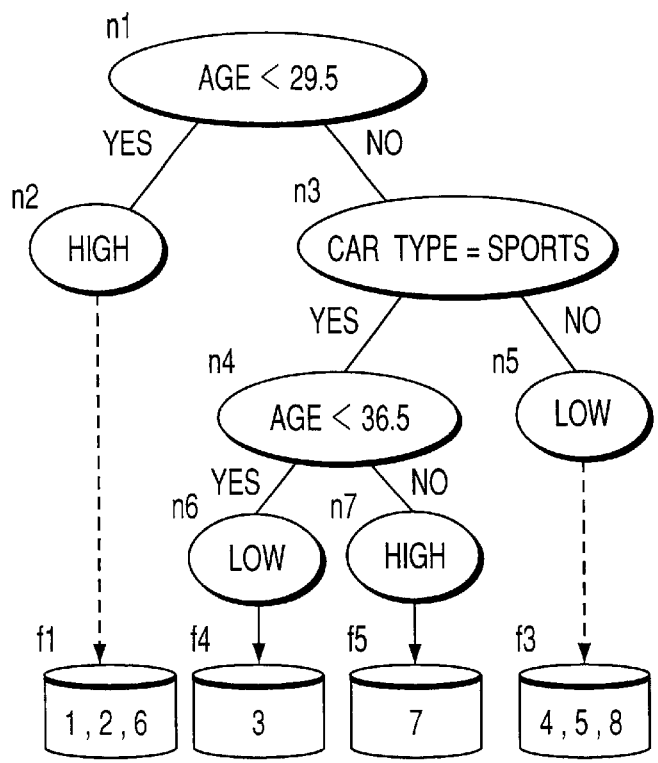
FIG. 4 is a view showing a decision tree for a data insertion result.
FIG. 5 is a node table.
FIG. 6 is a table representing a decision tree.

The tree shown in FIG. 4 is represented by a node condition table shown in FIG. 5 and a node connection table shown in FIG. 6. The node searching is performed in accordance with the following program using the above tables.

```
TOP:
    READ ONE INSERTION RECORD,
    IF (EMPTY, PROCESSING ENDS)
    CURRENT NODE=1
LOOP:
    IF (NO CHILD ENTRY IS IN THE CURRENT NODE
        OF NODE CONDITION TABLE
    THEN, (DETERMINE THAT CURRENT NODE IS A
        LEAF BELONGING TO INSERTION RECORD)
    GOTO TOP
    F (THE INSERTION DATA SATISFIES CONDITION
        OF CURRENT NODE OF THE NODE CONDI-
        TION TABLE)
    THEN, (DETERMINE THAT CURRENT NODE=
        LEFT CHILD OF NODE CONNECTION TABLE)
    ELSE, (CURRENT NODE =RIGHT CHILD OF
        NODE CONNECTION TABLE)
    GOTO LOOP
```

Data is inserted in the decision tree while searching the leaf node in accordance with the above process.

(Second Embodiment)

Operation of deleting data from a decision tree already created will be described as the second embodiment of the present invention. Operation of deleting two data from a database shown in FIG. 4 will be described with reference to FIGS. 7A to 7C and the flow chart of FIG. 8.

Figures 7A, 7B, 7C:
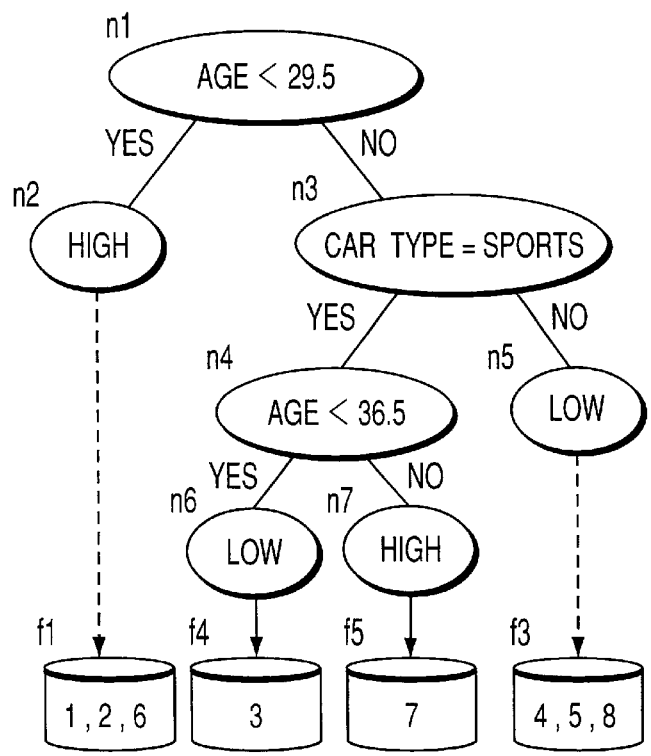
FIGS. 7A to 7C are views for explaining decision tree data mining in a data deletion mode as the second embodiment of the present invention.

Assume records 3 and 6 are to be deleted, as shown in FIGS. 7A to 7C. In this case, these deletion data are input to an application section 11 shown in FIG. 1. The application section 11 applies a decision tree to find corresponding node numbers. A node of Age<29.5 is tested for record 3 to select the right branch. A node of Car Type=sports is tested to select the left branch. A node of Age<36.5 is tested to select the left branch, and the query reaches node n6. Since n6 is a leaf node, the query is immediately ended. The application section 11 registers node number=n6, record number=3, and flag=deletion in a modification data list 12. A node of Age<29.5 is tested for record 6 to select the left branch, and the query reaches node n2. Since n2 is a leaf node, the query is immediately ended. The application section 11 registers node number=n2, record number=6, and flag=deletion in the modification data list 12 (S21).

When all the deletion data are completely registered in the modification data list 12, a modification section 13 is activated to modify the corresponding decision tree with reference to the modification data list 12. That is, the modification section 13 reads out node number=n6, record number=3, and flag=deletion from the modification data list 12 (S22) and deletes record number 3 from record set f4 of the corresponding database (S23). In this case, f4 becomes empty and must be subjected to merge processing. More specifically, whether the record set is empty is determined (S24). Node N6 corresponding to f4 is empty, and a test for node n4 that has generated n6 need not be conducted. That is, nodes n4 and n6 are merged with n7 (S25). Record set f4 that is empty is deleted. That is, the record sets are merged (S26).

Figures 9A, 9B, 9C:
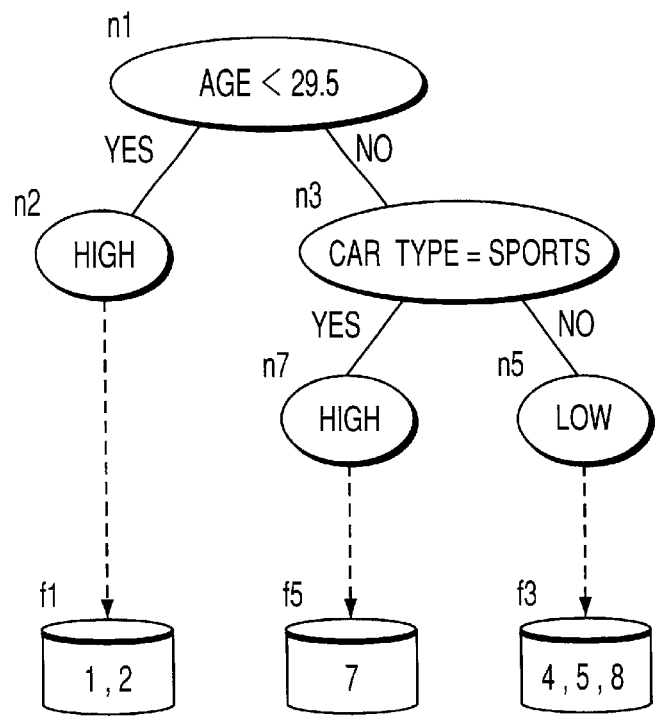
FIGS. 9A to 9C are views showing a decision tree for a data deletion result.

When processing is not ended (S27), the flow returns to step S22. In step S22, node number=n2, record number=6, and flag=deletion are read out from the modification data list 12. In step S23, record number 6 corresponding to node number n2 is deleted from record set f1 of the corresponding database. In this case, record set f1 is not empty, and no node merge processing is performed. Tables shown in FIGS. 9A and 9B and a decision tree shown in FIG. 9C are obtained by the above deletion processing.

(Third Embodiment)

The first embodiment has described the method of dividing a leaf node of an already created tree using insertion data. A better tree may be obtained not by dividing a leaf node by insertion data but by reconstructing a partial tree. This will be described below.

Figures 10A, 10B:
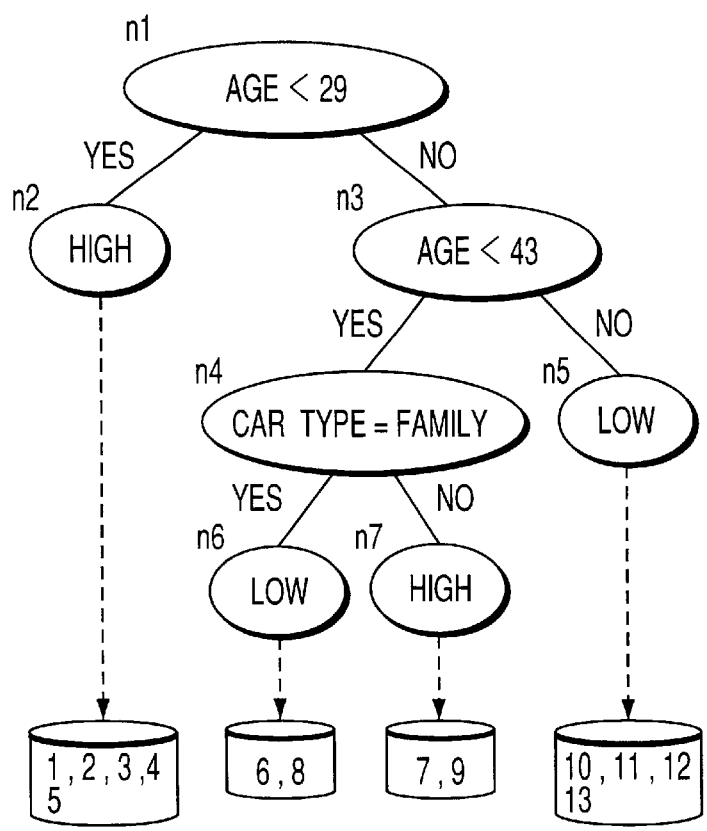
FIGS. 10A and 10B are views for explaining decision tree incremental data mining as the third embodiment of the present invention.

A decision tree shown in FIG. 10B is generated for 13 records of a training set shown in FIG. 10A in the same manner as in the first embodiment. More specifically, as shown in FIG. 10B, an evaluation value of Age<29 is maximum and selected. The records are classified into a set satisfying Age<29 and a set not satisfying Age<29. The set satisfying Age<29 includes records 1 to 5, while the set not satisfying Age<29 includes records 6 to 13. The set not satisfying Age<29 is further classified into a set satisfying Age<43 and a set not satisfying Age<43. The set satisfying Age<43 includes records 6 to 9, while the set not satisfying Age<43 includes records 10 to 13. In the next step, optimal division is checked for the left branch of the tree. A division of Car Type=family is selected, and records 6 to 9 are divided on the basis of this division. That is, the records are classified into records 6 and 8 satisfying Car Type=family and records 7 and 9 not satisfying Car type=family. Since all the records belong to the same class in accordance with the above divisions, a further division is not required, and decision tree generation is ended.

Figure 11C:
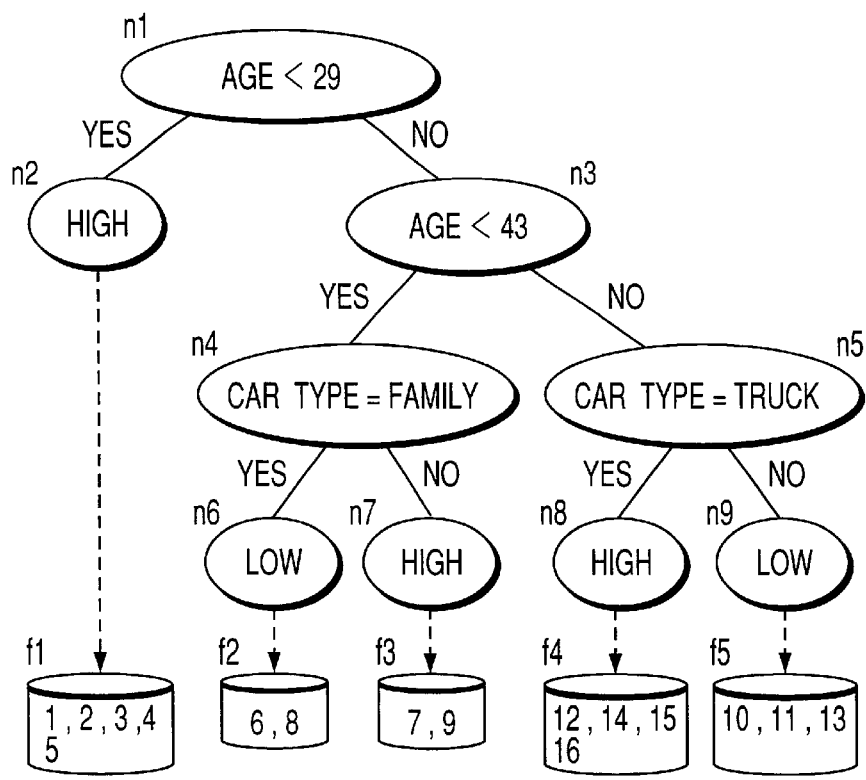

When three records 14, 15, and 16 shown in FIG. 11B are inserted in the table shown in FIG. 11A, a decision tree shown in FIG. 11C is generated using the same method as in the first embodiment. According to this decision tree, node n3 of Age<43 in FIG. 10B is tested to select the right branch. Node n5 of Car Type=truck is tested to select the left branch, and the query reaches node n8. Since n8 is a leaf node, the query is immediately ended. Node n3 of Age<43 is tested to select the right branch, and node n5 of Car Type=truck is tested to select the right branch. The query reaches node n9. Since n9 is a leaf node, the query is immediately ended. As described above, for insertion data, a decision tree is generated not by dividing a leaf node but reconstructing a partial tree.

This embodiment presumes pruning. In node n8, record 12 has a low risk, while records 14, 15, and 16 have high risks. However, these records can be merged to a single node by cutback.

To reconstruct a partial tree, a specific node below which a partial tree is reconstructed must be determined. A method of recalculating the evaluation value of each node by division after data is inserted and determining whether a partial tree is reconstructed will be described below. A various kinds of methods are devised as a method of calculating an evaluation value. Here, the method of calculating information entropy is explained. Basically, the difference between the information entropy of a node before division and the information entropy of this node after division is an evaluation value. Assuming that $\underline{n}$ records in a given node are set "high" and $\underline{m}$ records in this node are set "low", the information entropy of this node is represented by plogp+ qlogq, provided that $p=n/(n+m)$ and $q=m/(n+m)$.

To recalculate the evaluation value in each node, a class distribution in each node is required. The class distribution is defined as a pair of the number of data whose risk values as the class are "high" and the number of data whose risk values are "low".

The class distribution, i.e., the high and low distribution of the class in each node before data is inserted (FIG. 10B) is given by n1:(7,6)
n2:(5,0)
n3=(2,6)
n4:(2,2)
n5:(0,4)
n6=(0,3)
n7:(2,0)

The above distribution allows calculating the evaluation value by division. The weighted mean of entropies is calculated as the evaluation value. The evaluation values in nodes n1 and n3 are calculated as 0.5 and 0.31, respectively.

The class distribution after data insertion (FIG. 11B) is given by n1:(10,6)
n2:(5,0)
n3:(5,6)
n4:(5,0)
n5:(3,4)
n6:(0,2)
n7:(2,0)
n8:(3,1)
n9:(0,3)

Similar calculations yield the evaluation values in nodes n1 and n3 as 0.68 and 0.004, respectively. As can be obvious from these calculations, the evaluation value by division in node n3 is small and indicates an unsatisfactory division. A partial tree is therefore reconstructed in node n3.

Figure 12:
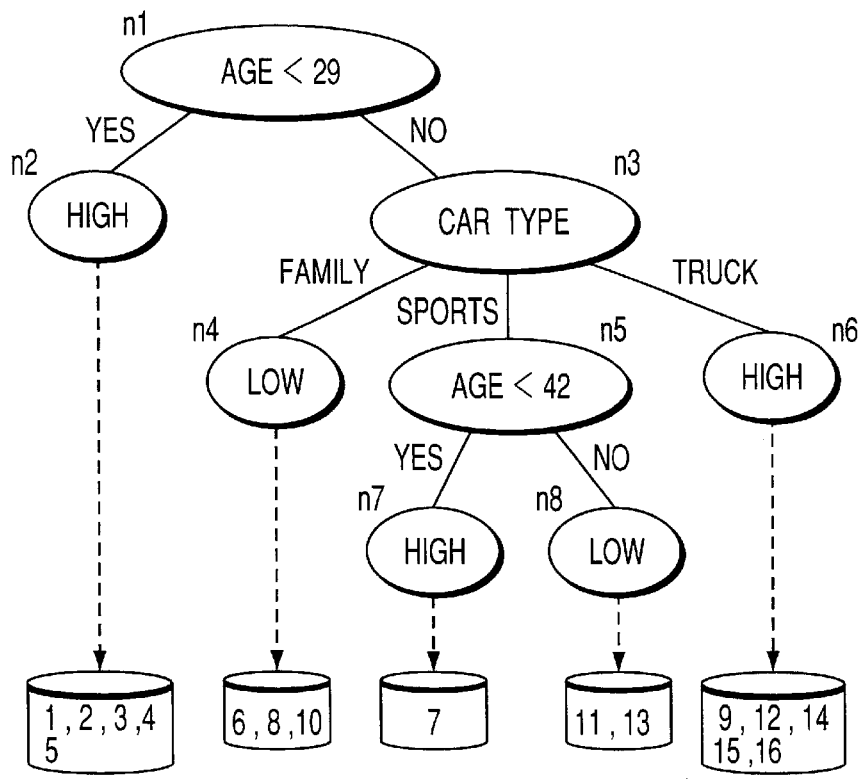
FIG. 12 is a view showing a partial tree reconstructed in the data insertion mode of the third embodiment.

A partial tree below n3 is reconstructed, as shown in FIG. 12. The class distribution in FIG. 12 is given by n1:(10,6)
n2:(5,0)
n3:(5,6)
n4:(3,0)
n5:(1,2)
n6:(4,1)
n7:(1,0)
n8:(0,2)

In this case, the evaluation value by division in node n3 becomes 0.43, obviously resulting in a satisfactory division by reconstruction. The number of nodes is reduced by one in the entire tree, and a better decision tree is obviously obtained.

According to the third embodiment, the application section 11 performs processing for applying insertion or deletion data to a decision tree created by a data set to or from which the data is inserted or deleted, and recalculating the evaluation value about a passing node. The modification section 13 performs processing for reconstructing a partial tree below the passing node when the evaluation value by division satisfies a specific condition.

Several methods are available to determine whether or not to reconstruct the partial tree described above. For example, it may be determined in accordance with whether a division evaluation value is equal to or smaller than a predetermined value, whether a ratio obtained upon comparing an evaluation value by division obtained upon data insertion with an evaluation value by division obtained before data insertion is equal to or smaller than a predetermined value, and whether an evaluation value changes upon checking a plurality of division methods and their evaluation values in the respective nodes stored in advance. The technique of the present invention is also applicable to record deletion or change as well as record insertion.

According to the present invention, when data is to be inserted to or deleted from a database, a decision tree is not created again using the entire database. By applying data to be inserted or deleted to a decision tree once created, and inserting a necessary node or deleting an unnecessary node, the decision tree corresponding to a change in database can be partially changed. The entire large scale database need not be accessed again to efficiently perform data mining.

In reconstructing a partial tree, data to be accessed are limited to records corresponding to leaf nodes below the corresponding node. The entire large scale database need not be accessed, thus efficiently performing data mining.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer implemented method of modifying a decision tree already created by data mining, comprising:
   applying insertion data to the already created decision tree, when the insertion data is newly input; and
   dividing a leaf node corresponding to the insertion data from the already created decision tree to modify the already created decision tree in accordance with the insertion data.

2. A method according to claim 1, wherein the dividing step includes searching for the leaf node corresponding to the insertion data and dividing the leaf node in accordance with relation between the insertion data and the leaf node.

3. A method according to claim 2, wherein the dividing step includes dividing the leaf node after the leaf nodes corresponding to all insertion data are searched.

4. A computer implemented method of modifying a decision tree already created by data mining, comprising:
   applying deletion data to the already created decision tree, when the deletion data is newly input; and
   merging a given node connected to a leaf node corresponding to the deletion data to another leaf node connected to the given node to modify the already created decision tree in accordance with the deletion data.

5. A method according to claim 4, wherein the merging step includes searching for the leaf node corresponding to the deletion data, and performing the merging in accordance with contents of a record set corresponding to the deletion data when the leaf node is searched.

6. A method according to claim 5, wherein the merging step includes merging the leaf nodes after leaf nodes corresponding to all deletion data are searched.

7. A computer implemented method of modifying a decision tree already created by data mining, comprising:
   applying insertion data or deletion data to the already created decision tree, when the insertion data or deletion data is newly input;
   recalculating an evaluation value by division about a passing node through which the data passes; and
   reconstructing a partial tree below the passing node to modify the already created decision tree, when the evaluation value obtained in the recalculating step satisfies a specific condition.

8. A computer implemented decision tree modification apparatus for modifying a decision tree already created by data mining, comprising:

an application unit configured to, when insertion data is newly input, apply the insertion data to the already created decision tree; and a modification unit configured to divide a leaf node corresponding to the insertion data in accordance with the application result to modify the already created decision tree.

9. An apparatus according to claim 8, which includes a modification data list which stores the application result generated by the application unit and wherein the modification unit modifies the already created decision tree based on the application result read out from the modification data list.

10. An apparatus according to claim 9, wherein when the insertion data is input to a database, the application unit applies the insertion data to the already created decision tree, searches for a leaf node corresponding to the insertion data and stores, in the modification data list, the number used for identifying the node, the insertion data and a flag indicating insertion, and the modification unit modifies the already created decision tree as referring to the modification data list.

11. An apparatus according to claim 9, wherein the modification unit divides the leaf node after leaf nodes corresponding to all insertion data are searched.

12. A computer implemented decision tree modification apparatus for modifying a decision tree already created by data mining, comprising:

an application unit configured to, when deletion data is input, apply the deletion data to the decision tree already created; and a modification unit configured to merge a given node connected to a leaf node of the decision tree already created, the leaf node corresponding to the deletion data, to another node connected to the given node to modify the already created decision tree.

13. An apparatus according to claim 12, which includes a modification data list which stores the application result generated by the application unit and wherein the modification unit modifies the already created decision tree based on the application result read out from the modification data list.

14. An apparatus according to claim 13, wherein the modification unit searches for the leaf node corresponding to the deletion data, and performs the merging in accordance with contents of a record set corresponding to the deletion data when the leaf node is searched.

15. An apparatus according to claim 14, wherein the modification unit merges leaf nodes after the leaf nodes corresponding to all deletion data are searched.

16. An apparatus according to claim 13, wherein the application unit applies the deletion data to a root node of the already created decision tree to search for the leaf node corresponding to the deletion data and stores the number used for identifying the leaf node, the deletion data and a flag indicating the deletion data in the modification data list.

17. A computer implemented decision tree modification apparatus for modifying a decision tree already generated by data mining, comprising:

an application unit configured to, when insertion data or deletion data is input, apply the insertion data or deletion data to the decision tree already created, recalculate an evaluation value by division about a passing node through which the data passes, and generate the recalculated evaluation value; and a modification unit configured to reconstruct a partial tree below the passing node when the evaluation value satisfies a specific condition.

18. An apparatus according to claim 17, which further comprises a modification data list configured to store the application result generated by the application unit, and wherein the modification unit modifies the already created decision tree on the basis of the application result read out from the modification data list.

* * * * *